(12) United States Patent
Arata

(10) Patent No.: US 7,137,589 B2
(45) Date of Patent: Nov. 21, 2006

(54) COMPOUND HELICOPTER WITH COMBINED WINGS AND LANDING STRUTS

(75) Inventor: Allen A. Arata, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 169 days.

(21) Appl. No.: 11/045,700

(22) Filed: Jan. 28, 2005

(65) Prior Publication Data
US 2006/0169834 A1 Aug. 3, 2006

(51) Int. Cl.
*B64C 27/26* (2006.01)
(52) U.S. Cl. .................... 244/6; 244/49; 244/102 R
(58) Field of Classification Search .................... 244/6, 244/7, 102 R, 105, 17.11, 17.17, 49
See application file for complete search history.

(56) References Cited

U.S. PATENT DOCUMENTS

| 2,187,040 | A | * | 1/1940 | Laddon et al. ........... 244/102 R |
| 2,511,362 | A | * | 6/1950 | Mercier ....................... 244/202 |
| 2,580,312 | A |   | 12/1951 | Moore ............................ 244/7 |
| 2,881,989 | A |   | 4/1959 | Fletner ........................... 244/6 |
| 2,989,268 | A | * | 6/1961 | Andrews .................... 244/7 R |
| 3,149,800 | A | * | 9/1964 | Fernandez Sintes et al. .......................... 244/7 R |
| 4,589,611 | A | * | 5/1986 | Ramme et al. ................. 244/6 |

* cited by examiner

*Primary Examiner*—Galen Barefoot
(74) *Attorney, Agent, or Firm*—Stetina Brunda Garred & Brucker

(57) ABSTRACT

The invention is a helicopter that includes a fuselage with a longitudinal axis, a main rotor and tail rotor; and right and left wings mounted to said fuselage. The right and left wings having at least a portion of which are rotatable from a horizontal position wherein they produce lift in forward flight, to an at least partially downward position wherein they act as landing struts.

10 Claims, 3 Drawing Sheets

FIG. 3
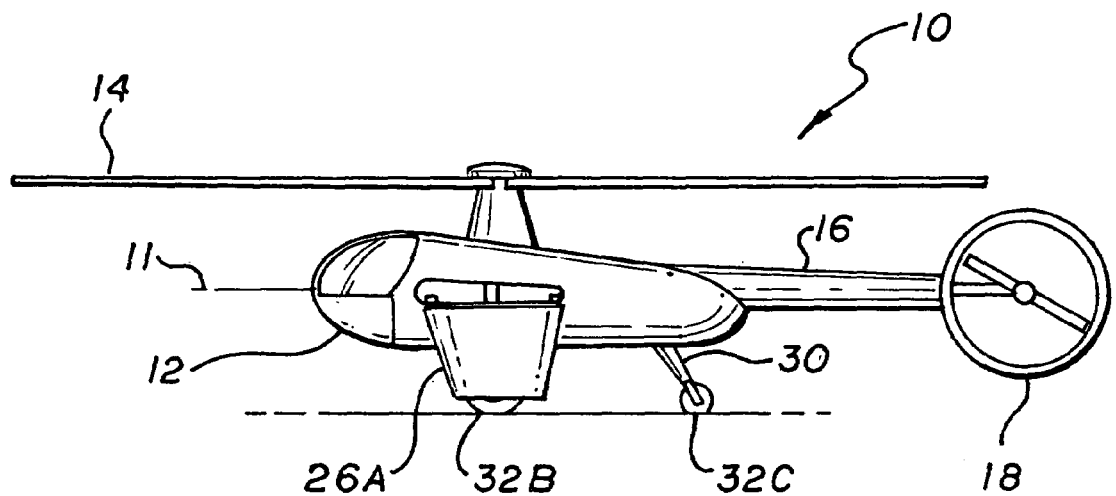
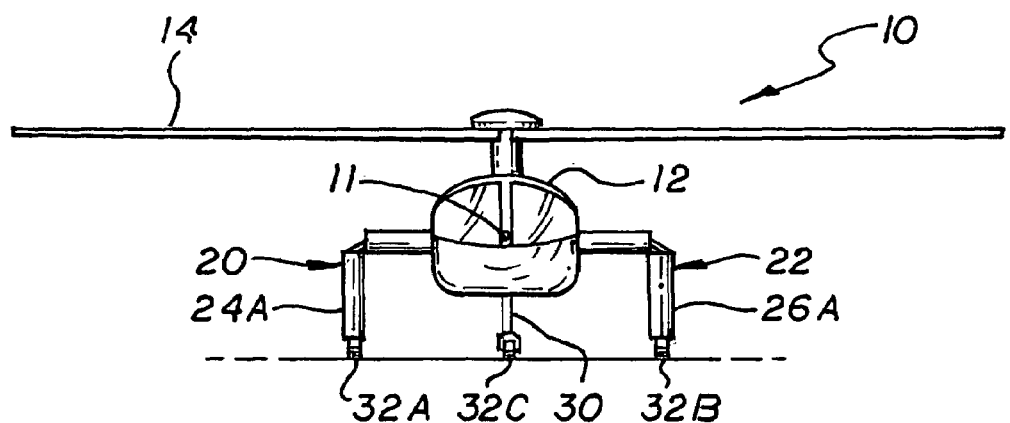
FIG. 4
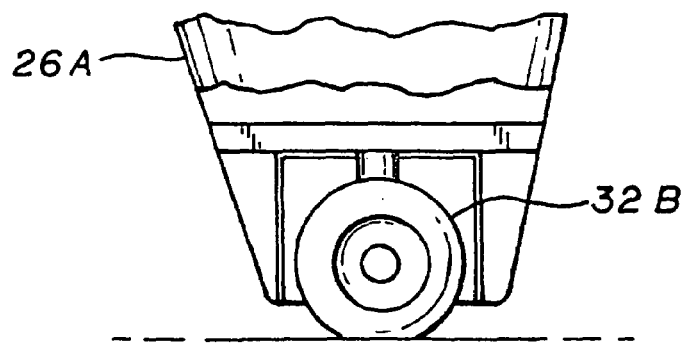
FIG. 5

COMPOUND HELICOPTER WITH COMBINED WINGS AND LANDING STRUTS

BACKGROUND OF THE INVENTION

1. Field of the Invention

The invention relates to the field of aircraft and, in particular, to a helicopter design.

2. Description of Related Art

Compound helicopters, having wings to provide lift during horizontal flight, loose efficiency during hover because of the disruption of downwash from the main rotor. This problem was addressed in U.S. Pat. No. 2,580,312 "Convertible Airplane And Helicopter" by H. K. Moore. Moore discloses an aircraft having a pusher propeller as well as a rotor. The wings of the airplane can be rotated from their leading edge downward, thus minimizing the effect of rotor downwash during vertical descent. However separate landing gear is required. Another approach is disclosed in U.S. Pat. No. 2,881,898 "Air Vehicle With Rotary Wing. By A. Flettner. Flettner discloses a compound helicopter type where in the wing tips of the wing are rotated downward by downwash of main rotor. During horizontal flight the lift forces produced by the wing tips to a horizontal position. The problem is that with no locking feature the wing tips will flutter. Furthermore, just rotating the wing tips will not significantly increase rotor efficiency during hover. Furthermore, separate landing apparatus is still required.

Thus, it is a primary object of the invention to provide a helicopter that incorporates wings for horizontal flight and which can be converted to landing struts.

It is another primary object of the invention to provide a helicopter that incorporates wings for horizontal flight and which can be converted to landing struts by rotating at least a portion of the wings downward so that they act as struts.

It is a further object of the invention to provide a helicopter that incorporates wings for horizontal flight and which can be converted to landing struts by rotating at least a portion of the wings downward so that they act as struts and provide minimum blockage of main rotor downwash during hover.

SUMMARY OF THE INVENTION

The invention is a helicopter having fuselage with a longitudinal axis. The helicopter further includes a main rotor and tail rotor. Right and left wings are mounted to the fuselage. At least a portion of the right and left wings are rotatable from a horizontal position wherein they produce lift in forward flight, to an at least partially downward position wherein the right and left wings extend beyond the fuselage and act as landing struts. Preferably the right and left wings are rotatable to a vertically downward position. A strut is mounted to the fuselage along the longitudinal rearward of the right and left wings to provide a three point support. Preferably, wheels are mounted on the ends of the right and left wings.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 3 is view similar to FIG. 1 with the wings rotated downward.

FIG. 4 is a front view of the helicopter shown in FIG. 3 with the wings rotated downward.

FIG. 5 is a partial view of the folded wing shown in FIG. 4 illustrating the incorporation of a wheel at the wing tip.

DESCRIPTION OF THE PREFERRED EMBODIMENT

Figure 1:
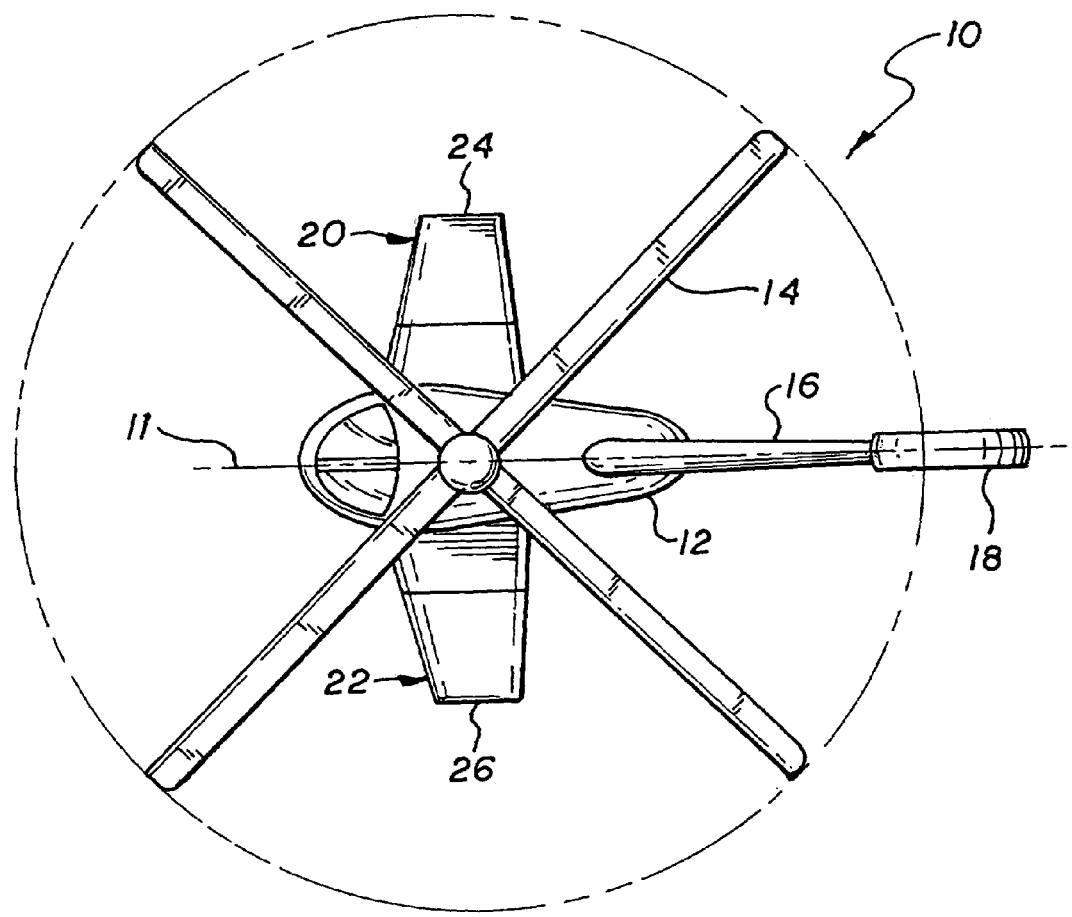
FIG. 1 is a top view of a helicopter with the wings extended.
Figure 2:
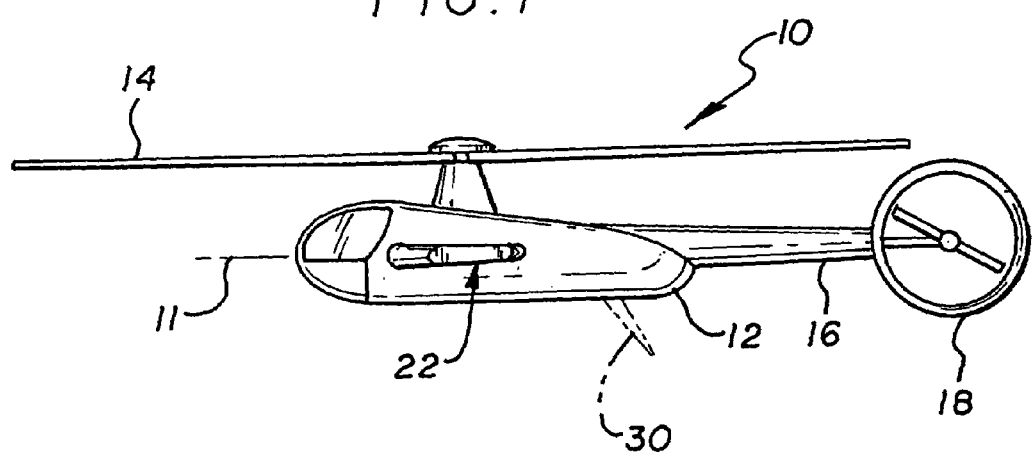
FIG. 2 is a side view of a helicopter shown in FIG. 1.

Referring to FIGS. 1 and 2, a helicopter, generally indicated by numeral 10, having longitudinal axis 11. The helicopter 10 includes a fuselage 12 having a main rotor 14, tail boom 16 incorporating a tail rotor 18. This particular configuration is presented for purposes of illustration only; other configurations are adaptable. Right and left wings 20 and 22 are mounted to the fuselage 12. The wings 20 and 22 have portions 24 and 26 movable from a horizontal position as shown in FIG. 1 to a vertically downward position indicated by numerals 24A and 26B shown in FIG. 2. It should be noted that the portions 24 and 26 of the wings can include the whole wings or any portion thereof as long as they extend beyond the fuselage 12 when in the vertical position. Note also they need not extend totally vertical as indicated in FIG. 3, again as long as they extend beyond the fuselage 12.

Thus when the wings 20 and 22 have the portions 24 and 26 in the horizontal position they provide lift during flight and thus reduce the power required to keep the helicopter in the air. When hovering, the portions 24 and 26 are moved to the vertical positions, 24A and 26A; they cause little effect on the downwash from the main rotor 14 improving efficiency.

A mounted strut 30 mounted on the longitudinal axis 11 aft of the wings 20 and 22 provides three point support for the helicopter. This strut 30 may also be retractable as illustrated in FIG. 1. In addition, the portions 24 and 26 as well as the strut 30 can include wheels 32A, 32B and 32C, respectively, so that the helicopter can easily taxi when on the ground. This is particularly illustrated in FIG. 5. However, they may just include a skid pad.

Figure 6:
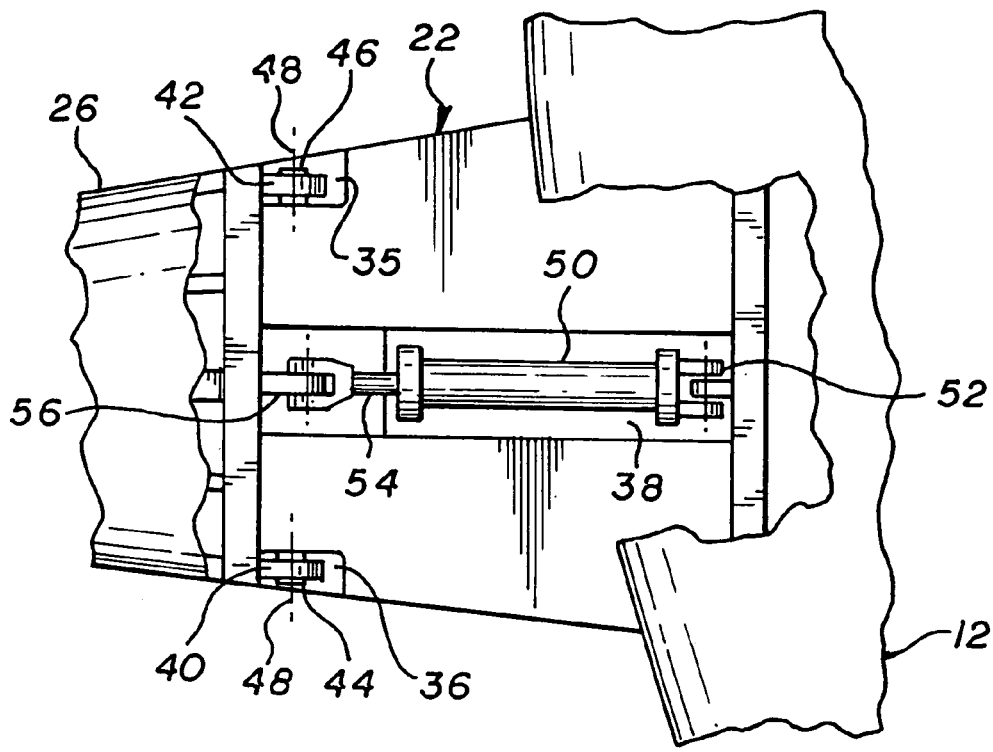
FIG. 6 is an enlarged view of FIG. 1 illustrating the wing fold mechanism.
Figure 7:
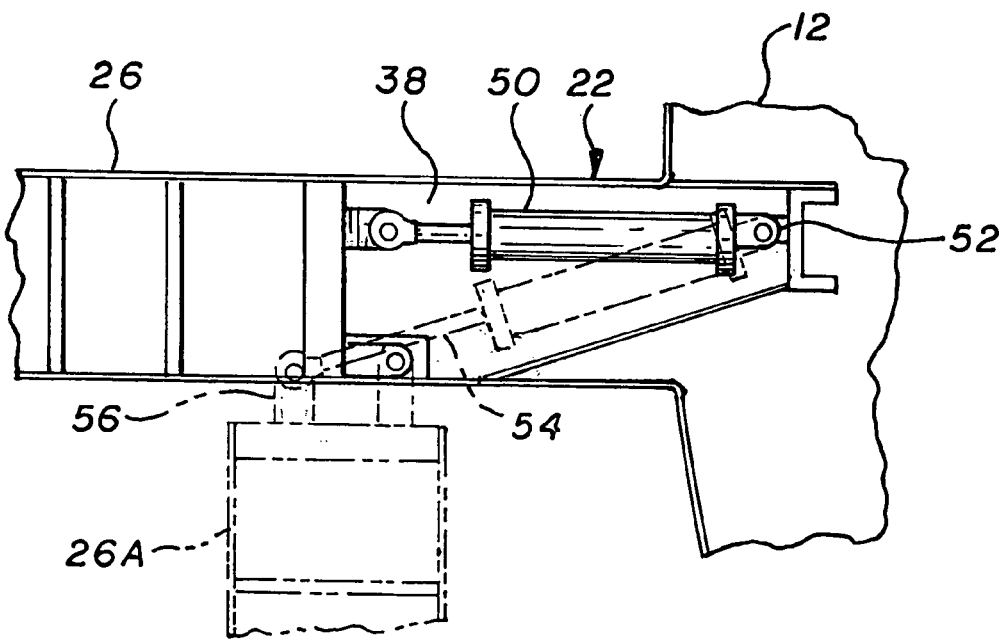
FIG. 7 is a side view of the wing fold mechanism illustrated in FIG. 6.

Illustrated in FIGS. 6 and 7 is a typical wing fold mechanism. While there are numerous wing fold mechanisms available; thus the following description of wing 22 is provided for purposes of illustration only. The wing 22 includes a front and rear slot 34 and 36 and a central slot 38. The portion 26 includes lugs 40 and 42 that extend into slots 34 and 36 and are pined by shafts 44 and 46 to the wing 22 and rotatable about axis 48. A double acting self-locking hydraulic cylinder 50 is mounted with in the slot 38 and is rotatably attached at end 52 to the wing 22 and by its extendable and retractable output shaft 54 to a lug 56 mounted on the portion 24. To rotate portion 24, the hydraulic cylinder 50 is unlocked and the output shaft 54 is extended. This causes portion 26 to rotate to position 26A where the cylinder 50 again locks. Using a hydraulic cylinder 50 that locks in both the retracted and extended positions eliminates the need for separate locks to secure the portion 24 in either position.

While the invention has been described with reference to a particular embodiment, it should be understood that the embodiment is merely illustrative as there are numerous variations and modifications, which may be made by those skilled in the art. Thus, the invention is to be construed as being limited only by the spirit and scope of the appended claims.

INDUSTRIAL APPLICABILITY

The invention has applicability to aircraft industry and, particular to the helicopter manufacturing industry.

The invention claimed is:

1. A helicopter having a longitudinal axis, said helicopter comprising:
    a fuselage;
    a main rotor and tail rotor; and
    right and left wings mounted to said fuselage and extending substantially perpendicular to the fuselage in a horizontal position, wherein at least a portion of each said perpendicularly extending right and left wings is rotatable between the horizontal position and an at least partially downward position, where the portions of said right and left wings extend beyond the fuselage and act as landing struts; and
    a pair of locking devices operative to lock the portions of the left and right wings in the horizontal position during flight and in the downward position when hovering.

2. The helicopter as set forth in claim 1 wherein the locking devices are operative to rotate said at least a portion of said left and right wings from the horizontal position to the downward position.

3. The helicopter as set forth in claim 2 wherein said right and left wings are rotatable to a vertically downward position.

4. The helicopter as set forth in claim 3 comprising a strut mounted to said fuselage along the longitudinal rearward of said right and left wings.

5. The helicopter as set forth in claim 4 wherein said strut is retractable.

6. The helicopter as set forth in claim 1, or 2, or 3, or 4, or 5, including wheels mounted on the ends of said right and left wings.

7. The helicopter as set for in claim 1, wherein the locking devices include a pair of hydraulic cylinders and a pair of extendable and retractable embedded within the left and right wings output for locking and driving the hydraulic cylinders.

8. An aircraft comprising at least one rotor mounted to a fuselage thereof, the aircraft further comprising:
    a pair of wing panels each having a proximal end extending laterally from the fuselage at a distal end; and
    a pair of rotating and locking devices operative to locking the wing panels in a horizontal position during flight and rotating the wing panels to a downward position for landing, wherein the distal ends extends beyond the fuselage in the downward position to support the aircraft on landing.

9. The aircraft of claim 8, wherein each of the wing panels further comprises a wheel mounted to the distal end thereof.

10. The aircraft of claim 8, wherein each of the pair of rotating and locking devices includes a hydraulic cylinder extending along an elongate axis within the wing panels and an extendable and retractable output shaft for driving and locking the hydraulic cylinder at the horizontal and downward positions.

* * * * *